United States Patent
Jia

(10) Patent No.: US 9,430,810 B2
(45) Date of Patent: Aug. 30, 2016

(54) DRAWING METHOD, APPARATUS, AND TERMINAL

(71) Applicant: Huawei Technologies Co., Ltd., Shenzhen (CN)

(72) Inventor: Xianghong Jia, Hanzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 14/331,642

(22) Filed: Jul. 15, 2014

(65) Prior Publication Data
US 2014/0327686 A1 Nov. 6, 2014

Related U.S. Application Data

(63) Continuation of application No. PCT/CN2013/084148, filed on Sep. 25, 2013.

(30) Foreign Application Priority Data

Mar. 7, 2013 (CN) .......................... 2013 1 0072936

(51) Int. Cl.
*G06F 15/16* (2006.01)
*G06T 1/00* (2006.01)
(Continued)

(52) U.S. Cl.
CPC .............. *G06T 1/20* (2013.01); *G06F 9/3867* (2013.01); *G06F 9/3877* (2013.01); *G06T 15/005* (2013.01); *G09G 5/363* (2013.01)

(58) Field of Classification Search
CPC ........ G09G 5/363; G09G 5/393; G06T 1/20; G06T 15/005; G06T 15/04; G06F 9/3867; G06F 9/3877

USPC ............... 345/502, 503, 522, 531, 545, 552; 712/200–203
See application file for complete search history.

(56) References Cited

U.S. PATENT DOCUMENTS 6,411,290 B1  6/2002 Sasaki
7,813,570 B2  10/2010 Shen et al.
(Continued)

FOREIGN PATENT DOCUMENTS

CN  1272194 A  11/2000
CN  1445664 A  10/2003
(Continued)

OTHER PUBLICATIONS

Partial English Translation and Abstract of Chinese Patent Application No. CN1445664A, May 14, 2015, 16 pages.
(Continued)

*Primary Examiner* — Ke Xiao
*Assistant Examiner* — Andrew Shin
(74) *Attorney, Agent, or Firm* — Conley Rose, P.C.; Grant Rodolph

(57) ABSTRACT

A drawing method, apparatus, and terminal, where: a drawing command set of a current frame is received; a CPU drawing time and a GPU drawing time of the current frame are determined according to the drawing command set of the current frame; and if the CPU drawing time is less than the GPU drawing time, the CPU is used to draw the current frame, and if the CPU drawing time is longer than the GPU drawing time, the GPU is used to draw the current frame. In this way, which drawing manner is adopted is dynamically determined according to the drawing time corresponding to the CPU/GPU, so as to shorten a drawing time of each frame to some extent, thereby increasing a display speed of a system and improving display performance.

5 Claims, 8 Drawing Sheets

(51) Int. Cl.
*G06F 9/30* (2006.01)
*G06T 1/20* (2006.01)
*G06T 15/00* (2011.01)
*G09G 5/36* (2006.01)
*G06F 9/38* (2006.01)

(56) References Cited

U.S. PATENT DOCUMENTS

| | | | |
|---|---|---|---|
| 8,108,844 | B2 | 1/2012 | Crutchfield et al. |
| 2002/0027555 | A1 | 3/2002 | Mori |
| 2006/0059494 | A1 | 3/2006 | Wexler et al. |
| 2006/0248543 | A1 | 11/2006 | Jin et al. |
| 2008/0276262 | A1 | 11/2008 | Munshi et al. |
| 2009/0027403 | A1 | 1/2009 | Jung |
| 2009/0067509 | A1* | 3/2009 | Poon ............... G09G 3/3648 375/240.26 |
| 2009/0141033 | A1 | 6/2009 | Street |
| 2009/0309880 | A1 | 12/2009 | Chen et al. |
| 2010/0020088 | A1 | 1/2010 | Harumoto |
| 2010/0045682 | A1 | 2/2010 | Ford et al. |
| 2011/0157195 | A1 | 6/2011 | Sprangle et al. |
| 2011/0234592 | A1 | 9/2011 | Patel et al. |
| 2011/0310107 | A1 | 12/2011 | Shiraki |
| 2012/0092353 | A1 | 4/2012 | Paltashev et al. |
| 2012/0159090 | A1 | 6/2012 | Andrews et al. |
| 2013/0050229 | A1 | 2/2013 | Song et al. |

FOREIGN PATENT DOCUMENTS

| | | | |
|---|---|---|---|
| CN | 1649130 | A | 8/2005 |
| CN | 1702692 | A | 11/2005 |
| CN | 101091175 | A | 12/2007 |
| CN | 101354780 | A | 1/2009 |
| CN | 101622646 | A | 1/2010 |
| CN | 101667284 | A | 3/2010 |
| CN | 101706741 | A | 5/2010 |
| CN | 101802789 | A | 8/2010 |
| CN | 101911111 | A | 12/2010 |
| CN | 102117260 | A | 7/2011 |
| CN | 102521050 | A | 6/2012 |
| CN | 102810133 | A | 12/2012 |
| CN | 102945560 | A | 2/2013 |
| CN | 103164839 | A | 6/2013 |
| EP | 2068279 | A1 | 6/2009 |
| JP | 2007105917 | A | 4/2007 |
| JP | 2012003619 | A | 1/2012 |
| KR | 20090011574 | A | 2/2009 |
| TW | 201216200 | A1 | 4/2012 |
| WO | 2012141677 | A1 | 10/2012 |

OTHER PUBLICATIONS

Partial English Translation and Abstract of Chinese Patent Application No. JP2007105917A, May 14, 2015, 21 pages.
Foreign Communication From a Counterpart Application, Chinese Application No. 201310072936.0, Chinese Office Action dated Apr. 3, 2015, 10 pages.
Foreign Communication From a Counterpart Application, Chinese Application No. 201310072936.0, Chinese Search Report dated Mar. 9, 2015, 3 pages.
Foreign Communication From a Counterpart Application, Korean Application No. 10-2014-7012010, Korean Office Action dated Apr. 16, 2015, 3 pages.
Foreign Communication From a Counterpart Application, Korean Application No. 10-2014-7012010, English Translation of Korean Office Action dated Apr. 16, 2015, 2 pages.
Partial English Translation and Abstract of Japanese Patent Application No. JP2012003619, Aug. 31, 2015, 51 pages.
Foreign Communication From a Counterpart Application, Japanese Application No. 2015-503752, Japanese Office Action dated Jul. 7, 2015, 3 pages.
Foreign Communication From a Counterpart Application, Japanese Application No. 2015-503752, English Translation of Japanese Office Action dated Jul. 7, 2015, 3 pages.
Foreign Communication From a Counterpart Application, Taiwan Application No. 102149381, Taiwan Office Action dated Jul. 9, 2015, 6 pages.
Foreign Communication From a Counterpart Application, European Application No. 13844577.0, Extended European Search Report dated Jan. 30, 2015, 8 pages.
Radatz, J., "The IEEE Standard Dictionary of Electrical and Electronics Terms," Sixth Edition, IEEE Std 100-1996, Mar. 28, 2012, 9 pages.
Foreign Communication From a Counterpart Application, European Application No. 13844577.0, Extended European Search Report dated Dec. 10, 2015, 6 pages.
Foreign Communication From a Counterpart Application, PCT Application No. PCT/CN2013/084148, International Search Report dated Jan. 2, 2014, 7 pages.
Foreign Communication From a Counterpart Application, PCT Application No. PCT/CN2013/084148, Written Opinion dated Jan. 2, 2014, 6 pages.
Foreign Communication From a Counterpart Application, Chinese Application No. 2013100729360, Chinese Search Report dated Oct. 12, 2015, 3 pages.
Foreign Communication From a Counterpart Application, Chinese Application No. 2013100729360, Chinese Office Action dated Oct. 20, 2015, 8 pages.

* cited by examiner

DRAWING METHOD, APPARATUS, AND TERMINAL

CROSS-REFERENCE TO RELATED APPLICATIONS

This application is a continuation of International Application No. PCT/CN2013/084148, filed on Sep. 25, 2013, which claims priority to Chinese Patent Application No. 201310072936.0, filed on Mar. 7, 2013, both of which are hereby incorporated by reference in their entireties.

TECHNICAL FIELD

The present invention relates to computer technologies, and in particular, to a drawing method, apparatus, and terminal.

BACKGROUND

A two-dimensional (2D) graphic library is used as a core library in a computer operating system, and performance of individual drawing interfaces provided by the 2D graphic library directly affects timeliness of a system to respond to an operation on a user interface (UI). At present, there are two manners of creating a 2D drawing: a central processing unit (CPU) and a graphic processing unit (GPU). In terms of performance, the CPU manner is suitable for simple small-scene drawing, and the GPU manner is suitable for large-scene drawing. A scene in the 2D drawing refers to operational complexity (for example, geometric transformation) and a region size involved in a drawing process. Either adopting the GPU drawing manner for drawing of a small scene or adopting the CPU drawing manner for drawing of a large scene greatly reduces the performance, which directly affects UI performance of the system. Another implementation manner is determined by an application program to which a drawn frame belongs, and a developer can set in the application program whether the GPU manner is adopted for drawing. If the GPU drawing manner is set, the system adopts the GPU manner to draw each frame of content in the application program; otherwise, the CPU manner is adopted for drawing. However, when a manner configured in the application program is adopted, it is still unknown to the developer which one of GPU drawing and CPU drawing is preferable for the application program that is being developed. Therefore, it is inevitable that frames of some complex content are eventually drawn in the CPU manner or some simple frames are drawn in the GPU manner, which also leads to poor performance of the 2D drawing.

SUMMARY

Embodiments of the present invention provide a drawing method, apparatus, and terminal for improving display performance of a computer system to some extent.

According to a first aspect, an embodiment of the present invention provides a drawing method, including: receiving a drawing command set of a current frame, where the drawing command set includes one or more drawing commands and parameters of the drawing commands; determining a CPU drawing time and a GPU drawing time of the current frame according to the one or more drawing commands and the parameters of the drawing commands in the drawing command set of the current frame; and if the CPU drawing time is less than the GPU drawing time, using the CPU to draw the current frame, and if the GPU drawing time is less than the CPU drawing time, using the GPU to draw the current frame.

With reference to the first aspect, in a first implementation manner, the determining a CPU drawing time and a GPU drawing time of the current frame according to the one or more drawing commands and the parameters of the drawing commands in the drawing command set of the current frame includes: traversing each of the drawing commands and the parameter of the drawing command in the drawing command set of the current frame; querying in a preset performance table according to each of the drawing commands and the parameter of the drawing command to obtain a CPU drawing time and a GPU drawing time corresponding to each of the drawing commands and the parameter of the drawing command; summing up CPU drawing times of all the drawing commands in the drawing command set of the current frame to obtain the CPU drawing time of the current frame; and summing up GPU drawing times of all the drawing commands in the drawing command set of the current frame to obtain the GPU drawing time of the current frame.

With reference to the first implementation manner of the first aspect, in a second implementation manner, if the CPU drawing time and the GPU drawing time corresponding to the drawing command and the parameter of the drawing command are not found in the preset performance table, calculate a CPU drawing time and a GPU drawing time corresponding to the drawing command and the parameter of the drawing command according to the drawing command and the parameter of the drawing command; and the CPU drawing time and GPU drawing time obtained through the calculation, and store the drawing command and the parameter of the drawing command into the preset performance table.

With reference to the second implementation manner of the first aspect, in a third implementation manner, the calculating the CPU drawing time and the GPU drawing time corresponding to the drawing command and the parameter of the drawing command according to the drawing command and the parameter of the drawing command includes: drawing an image object corresponding to the drawing command and the parameter of the drawing command by using the CPU and the GPU respectively according to the drawing command and the parameter of the drawing command; and recording, in the process of drawing the image object corresponding to the drawing command and the parameter of the drawing command by using the CPU and the GPU respectively, times used by the CPU and the GPU to draw the image object respectively, where the recorded time used by the CPU to draw the image object corresponding to the drawing command and the parameter of the drawing command is the CPU drawing time corresponding to the drawing command and the parameter of the drawing command, and the recorded time used by the GPU to draw the image object corresponding to the drawing command and the parameter of the drawing command is the GPU drawing time corresponding to the drawing command and the parameter of the drawing command.

With reference to the first aspect, the first implementation manner of the first aspect, the second implementation manner of the first aspect or the third implementation manner of the first aspect, in a fourth implementation manner, the method further includes: if the CPU is used to draw the current frame, saving a CPU drawing result of the current frame in a bitmap, and if the GPU is used to draw the current frame, saving a GPU drawing result of the current frame in a texture; and displaying the drawing result saved in the bitmap or the texture on a screen.

According to a second aspect, an embodiment of the present invention provides a drawing apparatus, including: a receiving module configured to receive a drawing command set of a current frame, where the drawing command set includes one or more drawing commands and parameters of the drawing commands; a determining module configured to determine a CPU drawing time and a GPU drawing time of the current frame according to the one or more drawing commands and the parameters of the drawing commands in the drawing command set of the current frame; and a drawing deciding module configured to use the CPU to draw the current frame if the CPU drawing time is less than the GPU drawing time, and use the GPU to draw the current frame if the GPU drawing time is less than the CPU drawing time, where the CPU drawing time and the GPU drawing time of the current frame are determined by the determining module.

With reference to the second aspect, in a first implementation manner, the determining module is configured to: traverse each of the drawing commands and the parameter of the drawing command in the drawing command set of the current frame; query in a preset performance table according to each of the drawing commands and the parameter of the drawing command to obtain a CPU drawing time and a GPU drawing time corresponding to each of the drawing commands and the parameter of the drawing command; sum up CPU drawing times of all the drawing commands in the drawing command set of the current frame to obtain the CPU drawing time of the current frame; and sum up GPU drawing times of all the drawing commands in the drawing command set of the current frame to obtain the GPU drawing time of the current frame.

With reference to the first implementation manner of the second aspect, in a second implementation manner, the apparatus further includes: a calculating module configured to calculate the CPU drawing time and the GPU drawing time corresponding to the drawing command and the parameter of the drawing command according to the drawing command and the parameter of the drawing command if the CPU drawing time and the GPU drawing time corresponding to the drawing command and the parameter of the drawing command are not found in the preset performance table; and an updating module configured to store the CPU drawing time and the GPU drawing time that are calculated by the calculating module, and the drawing command and the parameter of the drawing command into the preset performance table.

With reference to the second implementation manner of the second aspect, in a third implementation manner, the calculating module is configured to, if the CPU drawing time and the GPU drawing time corresponding to the drawing command and the parameter of the drawing command are not found in the preset performance table by the determining module, draw an image object corresponding to the drawing command and the parameter of the drawing command by using the CPU and the GPU respectively according to the drawing command and the parameter of the drawing command, and record, in the process of drawing the image object corresponding to the drawing command and the parameter of the drawing command by using the CPU and the GPU respectively, times used by the CPU and the GPU to draw the image object respectively, where the recorded time used by the CPU to draw the image object corresponding to the drawing command and the parameter of the drawing command is the CPU drawing time corresponding to the drawing command and the parameter of the drawing command, and the recorded time used by the GPU to draw the image object corresponding to the drawing command and the parameter of the drawing command is the GPU drawing time corresponding to the drawing command and the parameter of the drawing command.

With reference to the second aspect, the first implementation manner of the second aspect, the second implementation manner of the second aspect or the third implementation manner of the second aspect, in a fourth implementation manner, the apparatus further includes: a saving module configured to save a CPU drawing result of the current frame into a bitmap if the CPU is used to draw the current frame, and save a GPU drawing result of the current frame into a texture if the GPU is used to draw the current frame; and a displaying module configured to display the drawing result saved in the bitmap or the texture on a screen.

According to a third aspect, an embodiment of the present invention further provides a terminal device, including a CPU, a GPU, and a device screen, where the CPU and the GPU are connected to the device screen, where the CPU is configured to: receive a drawing command set of a current frame, where the drawing command set includes one or more drawing commands and parameters of the drawing commands; determine a CPU drawing time and a GPU drawing time of the current frame according to the one or more drawing commands and the parameters of the drawing commands in the drawing command set of the current frame; and draw the current frame if the CPU drawing time is less than the GPU drawing time, and if the GPU drawing time is less than the CPU drawing time, the GPU is used to draw the current frame; the GPU is configured to draw the current frame; and the device screen is configured to display a drawing result of the current frame drawn by using the CPU or the GPU.

With reference to the third aspect, in a first implementation manner, the CPU is configured to: traverse each of the drawing commands and the parameter of the drawing command in the drawing command set of the current frame; query in a preset performance table according to each of the drawing commands and the parameter of the drawing command to obtain a CPU drawing time and a GPU drawing time corresponding to each of the drawing commands and the parameter of the drawing command; sum up CPU drawing times of all the drawing commands in the drawing command set of the current frame to obtain the CPU drawing time of the current frame; and sum up GPU drawing times of all the drawing commands in the drawing command set of the current frame to obtain the GPU drawing time of the current frame.

With reference to the first implementation manner of the third aspect, in a second implementation manner, the CPU is further configured to, if, for one of the drawing commands and a parameter of the drawing command in the drawing command set, a CPU drawing time and a GPU drawing time corresponding to the drawing command and the parameter of the drawing command are not found in the preset performance table, calculate the CPU drawing time and the GPU drawing time corresponding to the drawing command and the parameter of the drawing command according to the drawing command and the parameter of the drawing command; and store the calculated CPU drawing time and GPU drawing time, and the drawing command and the parameter of the drawing command in the preset performance table.

It can be seen that, in the drawing method, apparatus, and terminal provided by the embodiments of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 2A:
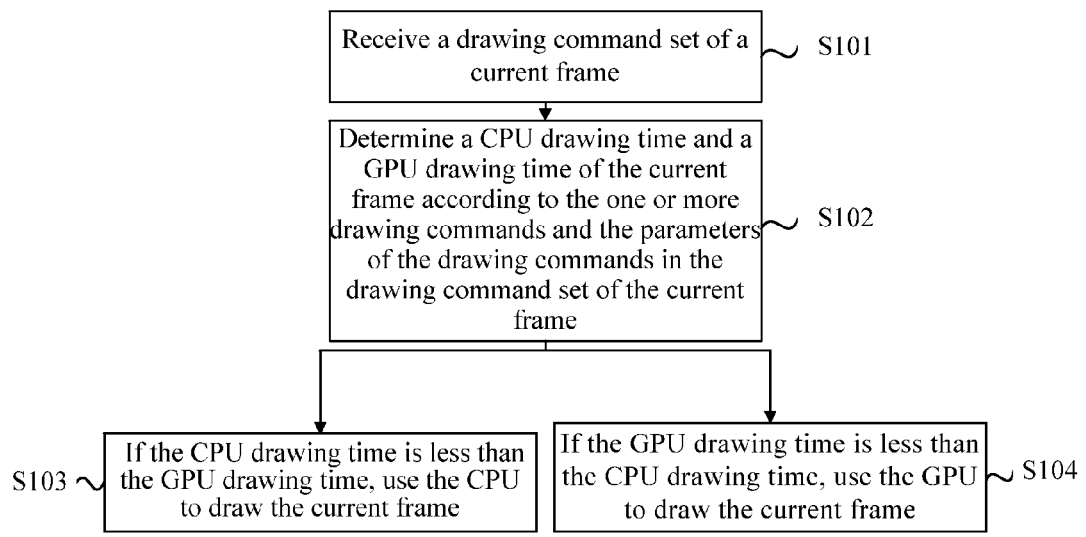
FIG. 2A is a schematic flowchart diagram of a drawing method according to an embodiment of the present invention.

Referring to FIG. 2A, FIG. 2A is a schematic flowchart diagram of a drawing method provided by an embodiment of the present invention. The drawing method provided by this embodiment of the present invention may be applied to a computer system, which may reside in a single physical host or distributed among a plurality of physical hosts. Specifically, the computer system may reside in one or more terminals such as computers, portable computers, hand-held devices (for example, mobile phones, tablet computers such as iPADs, and the like), and servers.

Figure 1:
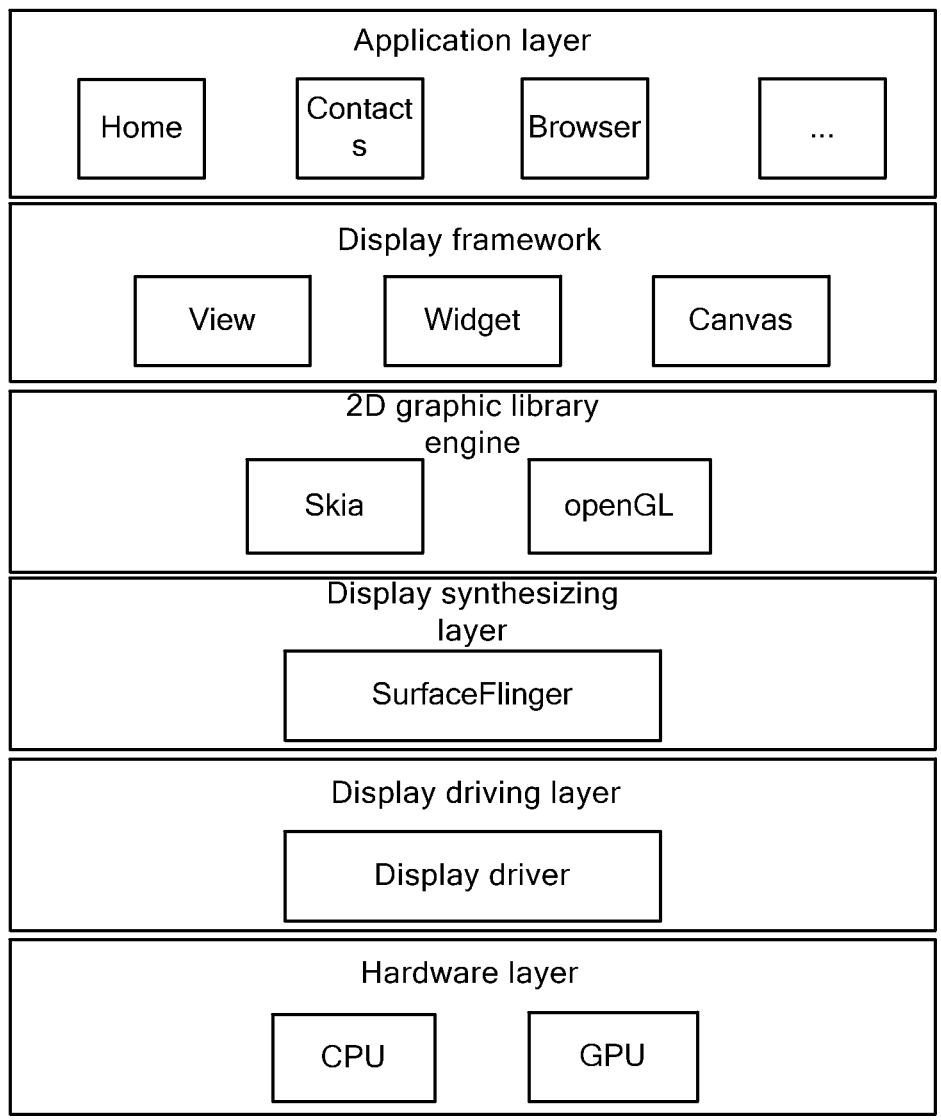
FIG. 1 is a schematic diagram of a logical structure of an existing terminal.

A logical structure of a terminal to which the drawing method provided by this embodiment of the present invention is applied is described by using FIG. 1 as an example. The terminal may be a smartphone. As shown in the figure, a hardware layer includes a CPU and a GPU and may further include a memory, an input/output device, a network interface and the like, and an operating system. Android and some application programs run at the hardware layer. As a core part of the operating system, a 2D graphic library engine includes a Skia for implementing CPU drawing and an Open Graphics Library (openGL) for implementing GPU drawing. In addition, the terminal further includes: a display driver of a display driving layer; a SurfaceFlinger of a display synthesizing layer; a display framework, including a view, a widget, and a canvas; and an application layer, including a main interface Home, a contact book, a browser, and the like that are commonly used in an Android operating system. In this terminal, by adopting the drawing method provided by the embodiment of the present invention, CPU drawing or GPU drawing can be dynamically selected according to a drawing command set of a current frame to improve drawing performance of the system.

As shown in FIG. 2A, the drawing method provided by the embodiment of the present invention includes:

S101. Receive a drawing command set of a current frame, where the drawing command set includes one or more drawing commands and parameters of the drawing commands.

The drawing commands may include linear gradients and picture gradients, and the corresponding parameters may include a region size, coordinates, gradient colors and the like; the drawing commands may further include drawing a square, a circle, a straight line, or a curve, and the corresponding parameters may include starting coordinates and ending coordinates of the drawing, a line type, line thickness, a line color and the like. It should be understood by a person skilled in the art that, what described above is only for illustration, and the drawing commands described in the embodiment of the present invention may also include any kind of drawing commands that may be used in any kind of computer systems, and the corresponding parameters may also be flexibly determined according to actual parameter requirements, and the embodiment of the present invention has no limitation thereon.

S102. Determine a CPU drawing time and a GPU drawing time of the current frame according to the one or more drawing commands and the parameters of the drawing commands in the drawing command set of the current frame.

The CPU drawing time is time necessary for the CPU to execute the entire drawing command set of the current frame, and the GPU drawing time is time necessary for the GPU to execute the entire drawing command set of the current frame.

S103. If the CPU drawing time is less than the GPU drawing time, use the CPU to draw the current frame.

Specifically, that the CPU drawing time is less than the GPU drawing time may be implemented as follows: a difference between the GPU drawing time and the CPU drawing time is greater than a certain threshold $k_1$. For example, if the CPU drawing time is $T_{CPU}$ and the GPU drawing time is $T_{GPU}$, $T_{GPU} - T_{CPU} = t_1$, $t_1 > k_1$, where $t_1 > 0$.

S104. If the GPU drawing time is less than the CPU drawing time, use the GPU to draw the current frame.

Specifically, that the GPU drawing time is less than the CPU drawing time may be implemented as follows: a difference between the CPU drawing time and the GPU drawing time is greater than a certain threshold $k_2$. For example, if the CPU drawing time is $T_{CPU}$ and the GPU drawing time is $T_{GPU}$, $T_{CPU} - T_{GPU} = t_2$, $t_2 > k_2$, where $t_2 > 0$.

It is worth noting that, $k_1$ and $k_2$ may be set to a specific value or a numeric value range respectively. $k_1$ and $k_2$ may be set to be the same as or different from each other.

It should be noted that, if the CPU drawing time of the current frame is equal to the GPU drawing time of the current frame; or if an absolute value of the difference between the CPU drawing time and the GPU drawing time of the current frame does not exceed a specific threshold $k_3$, for example, $k_3=2$ may be set; alternatively, if the difference between the CPU drawing time and the GPU drawing time of the current frame falls outside a specific range $k_3$, for example, $k_3[-2,2]$ or $[-3,4]$ may be set, it means that performance obtained by using the CPU to draw the current frame is close to that obtained by using the GPU to draw the current frame, and which drawing manner is adopted may be selected according to practical conditions of the current system. The embodiment of the present invention has no limitation thereon.

Using FIG. 1 as an example, the drawing method provided by the embodiment of the present invention may be applied to a 2D graphic library engine layer. At this layer, whether to call an application program interface (API) provided by the Skia to implement CPU drawing or to call an API provided by the openGL to implement GPU drawing is dynamically determined according to status of the CPU drawing time and the GPU drawing time.

Figure 2B:
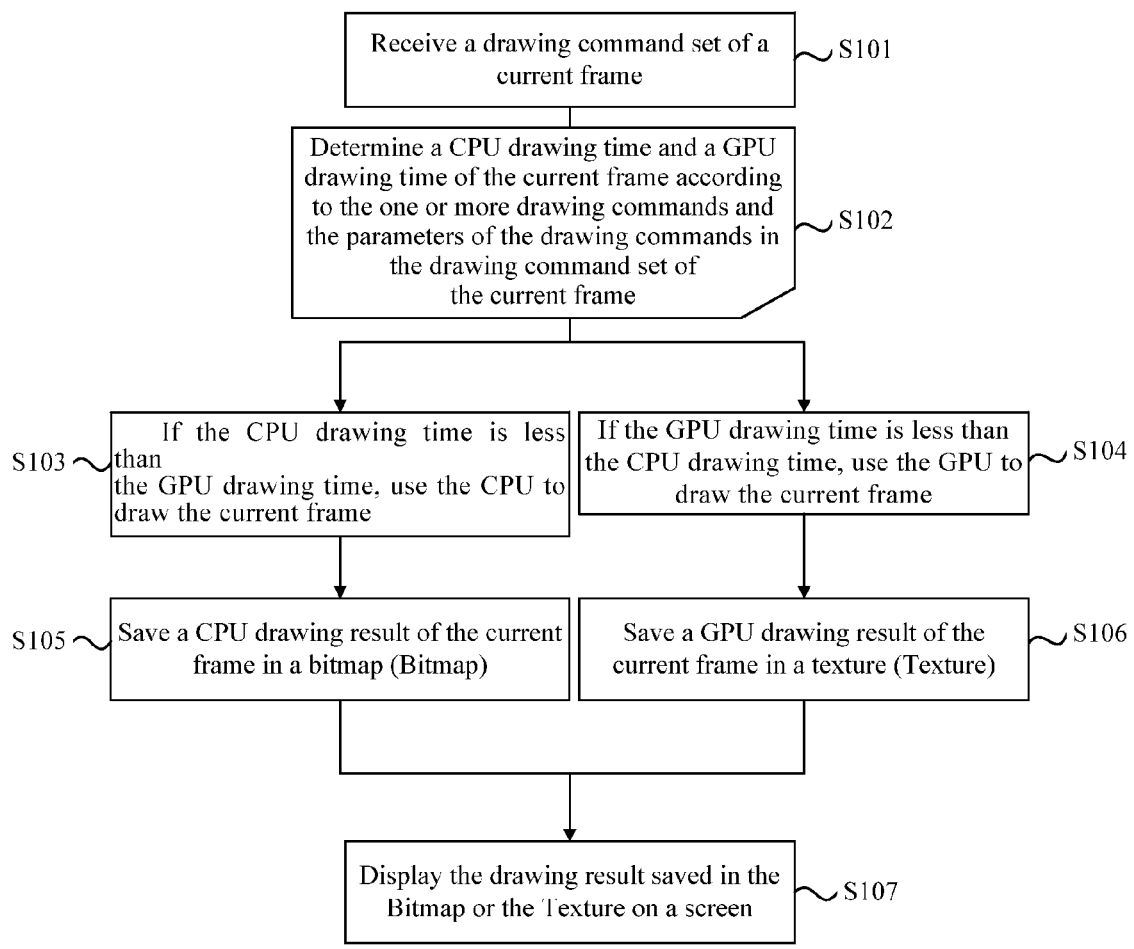
FIG. 2B is a schematic flowchart diagram of another drawing method according to an embodiment of the present invention.

Further, as shown in FIG. 2B, the embodiment of the present invention further includes:

S105. If the CPU is used to draw the current frame, save a CPU drawing result of the current frame in a bitmap.

S106. If the GPU is used to draw the current frame, save a GPU drawing result of the current frame in a texture.

The Bitmap and Texture are two different kinds of rendering channels provided in the operating system. Bitmap corresponds to a memory, and is accessed on a per-row and per-pixel basis. If the GPU drawing manner is adopted, drawing content is saved in the Texture after all drawing commands are executed. The Texture also corresponds to a memory, and is accessed by tile.

S107. Display the drawing result saved in the Bitmap or the Texture on a screen.

Using FIG. 1 as an example, the display synthesizing layer supports a plurality of tasks, and can display UI windows of a plurality of application programs at a time. Moreover, a plurality of windows may be created for one application program. After all the windows are drawn, a set including all the windows that can be currently displayed are displayed by the system as a final display result. After the synthesis is completed, the display driver of the display driving layer is called to copy the result into a frame buffer; and the display driver, for example, a liquid crystal display (LCD) driver of the terminal, displays content of the frame buffer on the screen.

It can be seen that, in the drawing method provided by the embodiment of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved.

Further, by selecting the Bitmap or Texture saving manner, different rendering channels can be selected for displaying according to different drawing manners. This improves the display performance of the system more effectively.

Figure 3A:
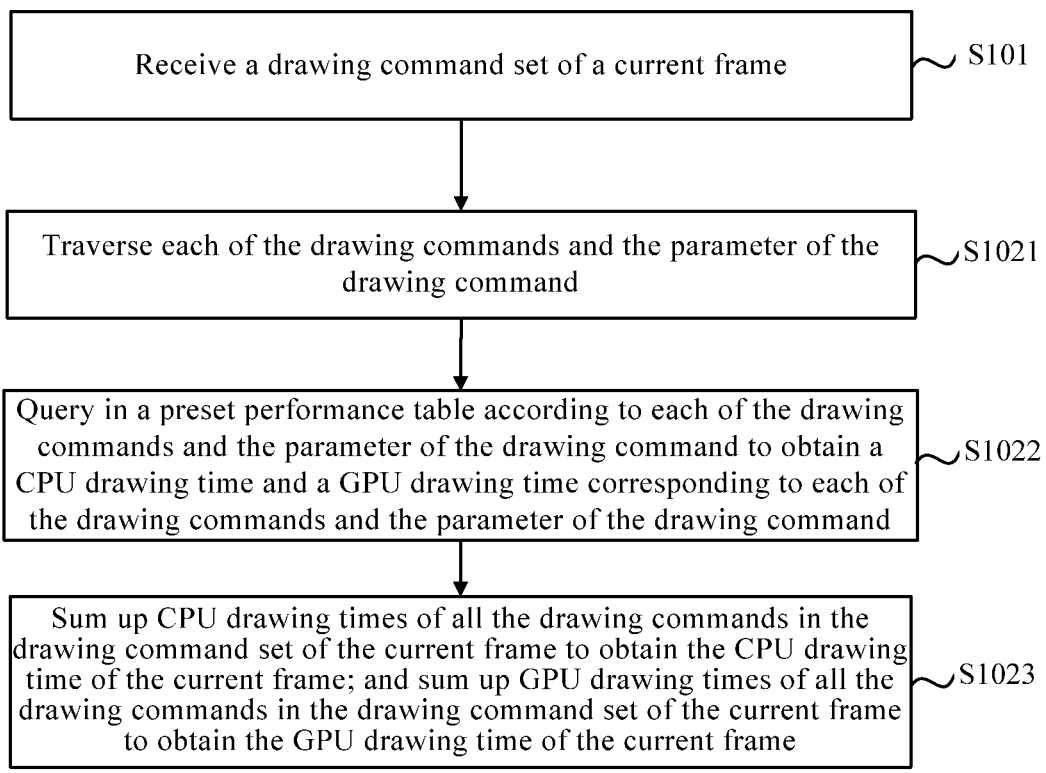
FIG. 3A is a schematic flowchart diagram of still another drawing method according to an embodiment of the present invention.

Referring to FIG. 3A, FIG. 3A is a schematic flowchart diagram of another drawing method provided by an embodiment of the present invention. The method may be applied to a computer system, which may reside in a single physical host or distributed among a plurality of physical hosts. Specifically, the method may be applied to the terminal shown in FIG. 1. The method includes:

S101. Receive a drawing command set of a current frame, where the drawing command set includes one or more drawing commands and parameters corresponding to the drawing commands respectively.

S1021. Traverse each of the drawing commands and the parameter of the drawing command.

S1022. Query in a preset performance table according to each of the drawing commands and the parameter of the drawing command to obtain a CPU drawing time and a GPU drawing time corresponding to each of the drawing commands and the parameter of the drawing command.

It should be noted that, in the embodiment of the present invention, the CPU drawing time or the GPU drawing time may vary with different parameters for a same drawing command.

S1023. Sum up CPU drawing times of all the drawing commands in the drawing command set of the current frame to obtain the CPU drawing time of the current frame; and sum up GPU drawing times of all the drawing commands in the drawing command set of the current frame to obtain the GPU drawing time of the current frame.

The embodiment of the present invention further includes S103 and S104 of the foregoing embodiment, and further, may include steps S105, S106, and S107 of the foregoing embodiment. Details are not further described herein.

It can be seen that, in the drawing method provided by this embodiment of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved. The following uses a specific embodiment to describe specific implementation of obtaining the CPU drawing time and the GPU drawing time of the current frame in the drawing method provided by the present invention.

Figure 3B:
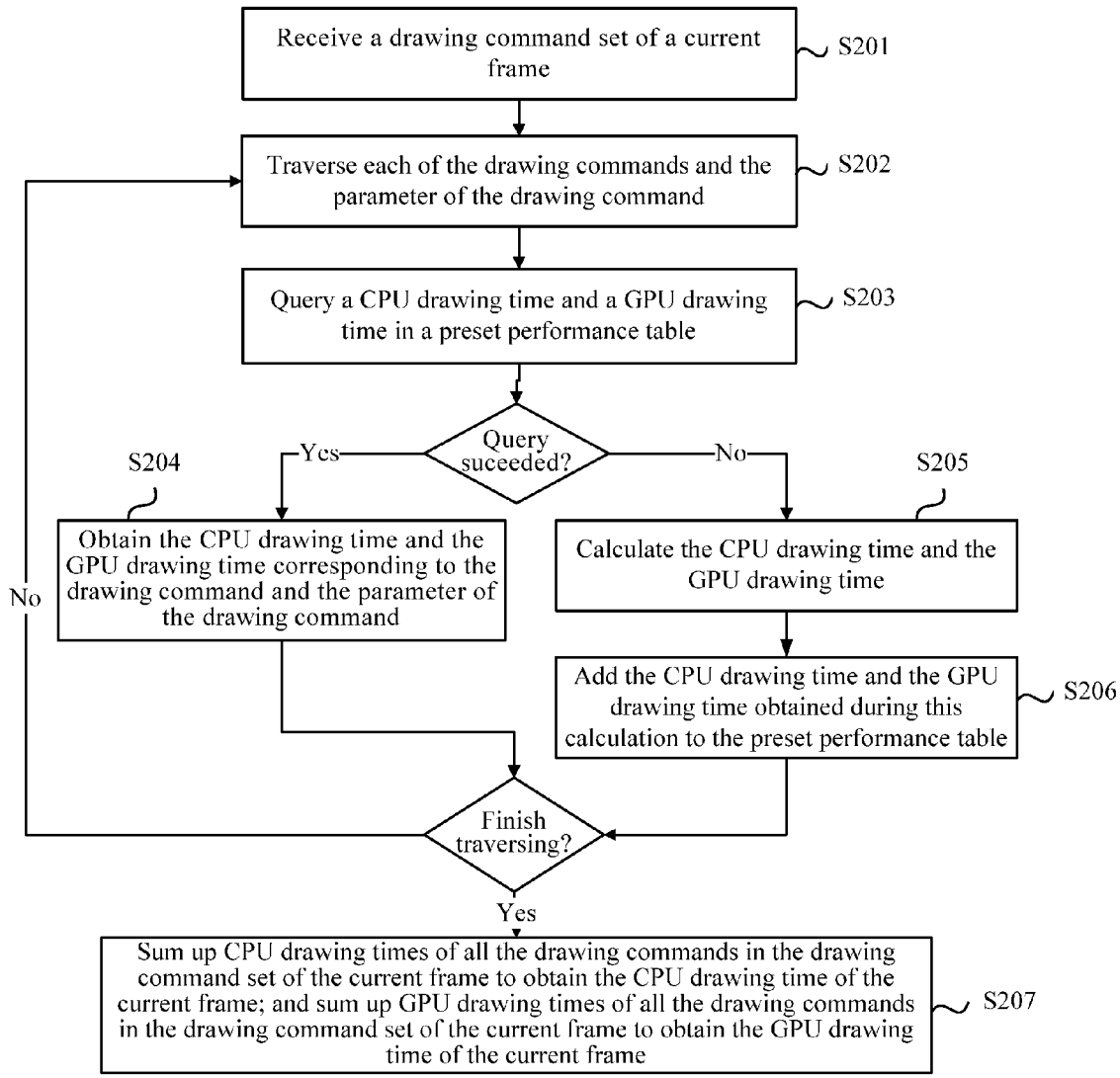
FIG. 3B is a schematic flowchart diagram of yet another drawing method according to an embodiment of the present invention.

As shown in FIG. 3B, the method includes:

S201. Receive a drawing command set of a current frame, where the drawing command set includes one or more drawing commands and drawing parameters corresponding to the drawing commands respectively.

S202. Traverse each of the drawing commands and the parameter of the drawing command.

S203. Query a CPU drawing time and a GPU drawing time in a preset performance table.

The preset performance table is illustrated as follows:

TABLE 1

Performance table

| 2D operation | Region size | GPU rendering (ms) | CPU rendering (ms) |
| --- | --- | --- | --- |
| Linear transformation | 10 * 10 | 27 | 100 |
| | 100 * 100 | 27 | 101 |
| | 600 * 400 | 28 | 121 |
| | 800 * 400 | 29 | 161 |
| Picture gradient | 100 * 100 | 108 | 80 |
| | 200 * 200 | 127 | 106 |
| | 600 * 400 | 175 | 195 |

As listed in Table 1, linear transformation and picture gradient are two drawing commands, which correspond to a drawing parameter, that is, a region size, respectively. A GPU rendering time and a CPU rendering time (calculated in a unit of milliseconds (ms)) of a drawing command can be determined according to the drawing command and the region size. For example, when the region size is 100*100 pixels and the drawing operation is picture gradient in Table 1, the required GPU rendering time and CPU rendering time are 108 ms and 80 ms respectively.

It should be noted that, Table 1 is only for illustration, and the drawing commands in Table 1 are also only for illustration. In some other embodiments of the present invention, the performance table may also include two or more parameters for the drawing commands. Different drawing parameters of a same drawing command usually have respective records in the performance table.

If the GPU drawing time and the CPU drawing time corresponding to the drawing command and the parameter of the drawing command are found in the preset performance table, go to step S204; otherwise, go to step S205.

S204. Obtain the CPU drawing time and the GPU drawing time corresponding to the drawing command and the parameter of the drawing command.

S205. Calculate the CPU drawing time and the GPU drawing time corresponding to the drawing command and the parameter of the drawing command.

Specifically, if, for one of the drawing commands and a parameter of the drawing command in the drawing command set, a CPU drawing time and a GPU drawing time corresponding to the drawing command and the parameter of the drawing command are not found in the preset performance table, a calculation process is activated; the drawing command and the parameter of the drawing command are passed to the calculation process; and then the CPU drawing time and the GPU drawing time corresponding to the drawing command and the parameter of the drawing command are simultaneously calculated by using the calculation process.

Optionally, the calculation method is as follows: draw an image object corresponding to the drawing command and the parameter of the drawing command by using the CPU and the GPU respectively according to the drawing command and the parameter of the drawing command; and record, in the process of drawing the image object corresponding to the drawing command and the parameter of the drawing command by using the CPU and the GPU respectively, times used by the CPU and the GPU to draw the image object respectively, where the recorded time used by the CPU to draw the image object corresponding to the drawing command and the parameter of the drawing command is the CPU drawing time corresponding to the drawing command and the parameter of the drawing command, and the recorded time used by the GPU to draw the image object corresponding to the drawing command and the parameter of the drawing command is the GPU drawing time corresponding to the drawing command and the parameter of the drawing command.

To implement timely update of the performance table, the method further includes:

S206. Add the CPU drawing time and the GPU drawing time obtained during this calculation to the preset performance table so that, if a same drawing command having the same parameter appears next time, the CPU drawing time and the GPU drawing time can be obtained directly by querying in the preset performance table.

After the CPU drawing time and the GPU drawing time corresponding to the drawing command and the parameter thereof are obtained in a manner of table query or calculation, it is determined whether traversing the drawing command set is completed. If it is completed, go to step S207; if it is not completed yet, return to step S202 to traverse a next drawing command.

S207. Sum up CPU drawing times of all the drawing commands in the drawing command set of the current frame to obtain the CPU drawing time of the current frame; and sum up GPU drawing times of all the drawing commands in the drawing command set of the current frame to obtain the GPU drawing time of the current frame.

After the CPU drawing time and the GPU drawing time of the current frame are obtained, whether the CPU drawing or the GPU drawing can be selected according to the method of the foregoing embodiment of the present invention. Further, the drawing result is saved and displayed. Reference may be made to the foregoing embodiments for detailed steps, which are not described again herein.

It can be seen that, in the drawing method provided by this embodiment of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved.

Figure 4A:
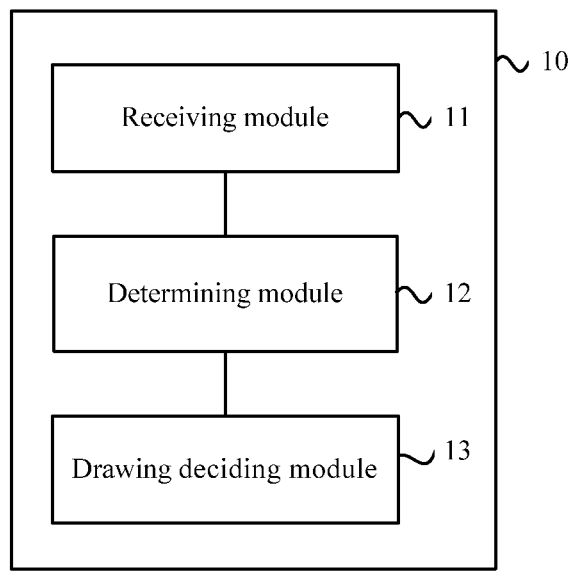
FIG. 4A is a schematic structural diagram of a drawing apparatus according to an embodiment of the present invention.

Referring to FIG. 4A, FIG. 4A is a schematic diagram of a logical structure of a drawing apparatus 10 provided by an embodiment of the present invention. The drawing apparatus 10 provided by this embodiment of the present invention may correspond to the 2D graphic library engine layer of the terminal system shown in FIG. 1. As shown in FIG. 4A, the apparatus includes a receiving module 11 configured to receive a drawing command set of a current frame, where the drawing command set includes one or more drawing commands and parameters of the drawing commands; where the drawing commands may include linear gradients and picture gradients, and the corresponding parameters may include a region size, coordinates, gradient colors and the like; the drawing commands may further include drawing a square, a circle, a straight line, or a curve, and the corresponding parameters may include starting coordinates and ending coordinates of the drawing, a line type, line thickness, a line color and the like. It should be understood by a person skilled in the art that, what described above is only for illustration, and the drawing commands described in the embodiment of the present invention may also include any kind of drawing commands that may be used in any kind of computer systems, and the corresponding parameters may also be flexibly determined according to actual parameter requirements, and the embodiment of the present invention has no limitation thereon. The apparatus also includes a determining module 12 configured to determine a CPU drawing time and a GPU drawing time of the current frame according to the drawing commands and the parameters of the drawing commands in the drawing command set of the current frame received by the receiving module 11, and a drawing deciding module 13 configured to use the CPU to draw the current frame if the CPU drawing time is less than the GPU drawing time, and use the GPU to draw the current frame if the GPU drawing time is less than the CPU drawing time, where the CPU drawing time and the GPU drawing time of the current frame are determined by the determining module 12.

Figure 4B:
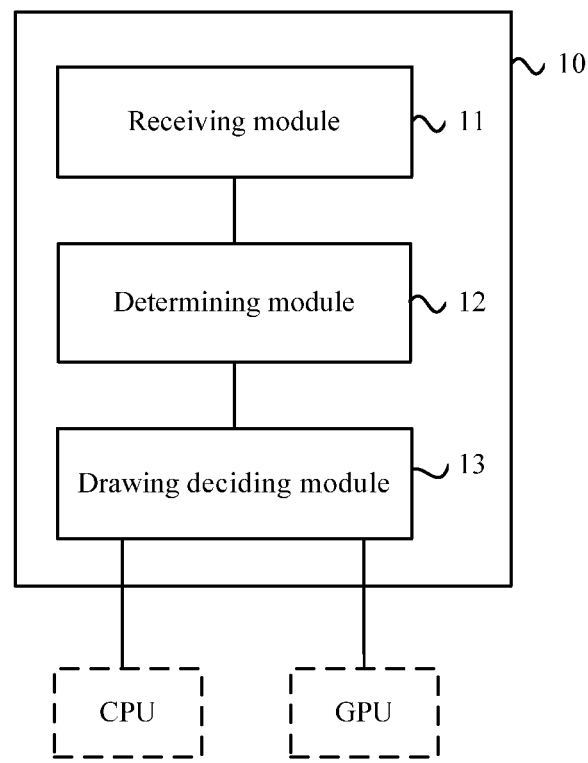
FIG. 4B is a schematic structural diagram of another drawing apparatus according to an embodiment of the present invention.

Referring to FIG. 4B, whether the CPU or the GPU is called to draw the current frame is determined by the drawing deciding module 13 according to a result of comparing the drawing times. The calling manner may be implemented by using the APIs provided in the graphic libraries Skia and openGL shown in FIG. 1. The CPU and GPU in FIG. 4B are two processors provided by the hardware layer of the terminal device where the drawing apparatus provided by this embodiment of the present invention is located.

Figure 4C:
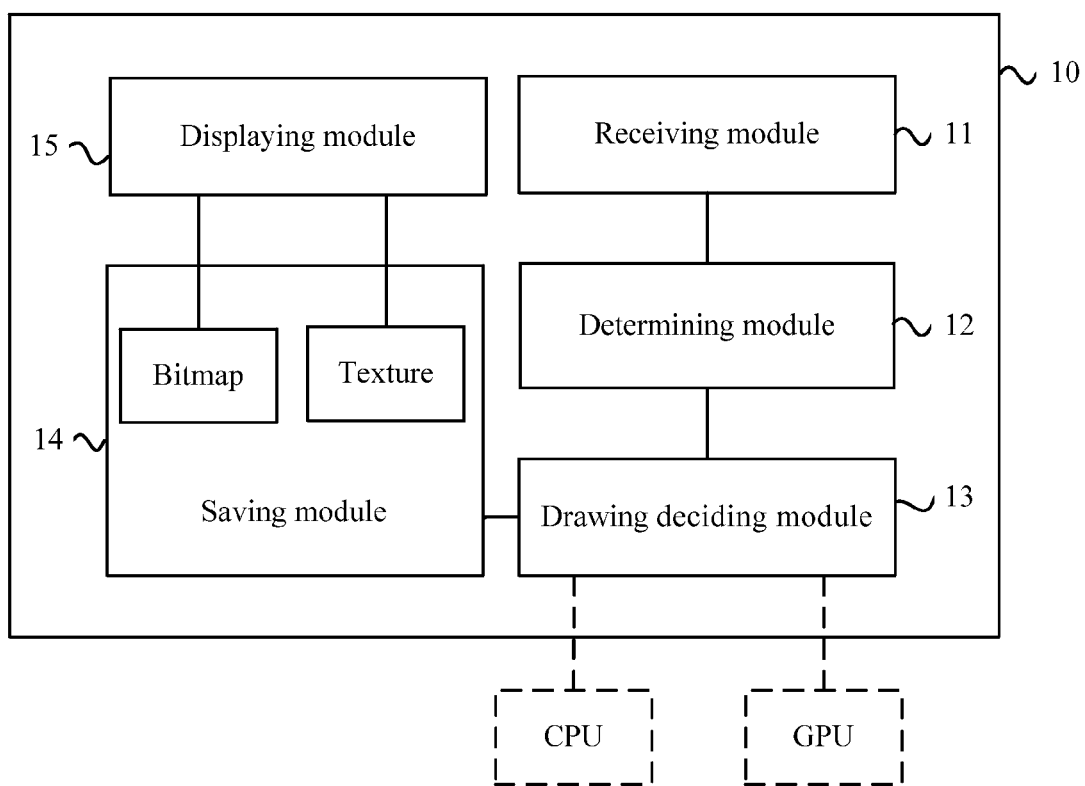
FIG. 4C is a schematic structural diagram of still another drawing apparatus according to an embodiment of the present invention.

Further, as shown in FIG. 4C, the drawing apparatus 10 further includes: a saving module 14 configured to save a CPU drawing result of the current frame in a Bitmap if the CPU is used to draw the current frame, and save a GPU drawing result of the current frame in a Texture if the GPU is used to draw the current frame; and a displaying module 15 configured to display the drawing result saved in the Bitmap or the Texture on a screen.

Using FIG. 1 as an example, the displaying module 15 may call SurfaceFlinger of the display synthesizing layer to synthesize the image. After the synthesis is completed, the display driver is called to copy the synthesis result into the frame buffer, and then the display driver displays content of the frame buffer on the screen.

It can be seen that, in the drawing apparatus provided by this embodiment of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved.

Further, by selecting the Bitmap or Texture saving manner, different rendering channels can be selected for displaying according to different drawing manners. This improves the display performance of the system more effectively.

It should be noted that, embodiments in this specification are described in a progressive manner, and for identical or similar parts between different embodiments, reference may be made to each other so that each of the embodiments focuses on differences from other embodiments. Especially, the apparatus embodiment is described relatively simply because it is substantially similar to the method embodiments, and for parts similar to those of the method embodiments, reference may be made to the method embodiments. For example, for a specific implementation method for the determining module 12, reference may be made to the method for obtaining the CPU drawing time and the GPU drawing time described in the foregoing embodiments. The performance table, for example, Table 1, used in the obtaining method is also a part of the apparatus of the present invention, and may be stored on a magnetic disk that does not cause data loss in a case of a power failure, so that the historical drawing data still exists even after the terminal is powered on and off for a plurality of times.

Figure 5:
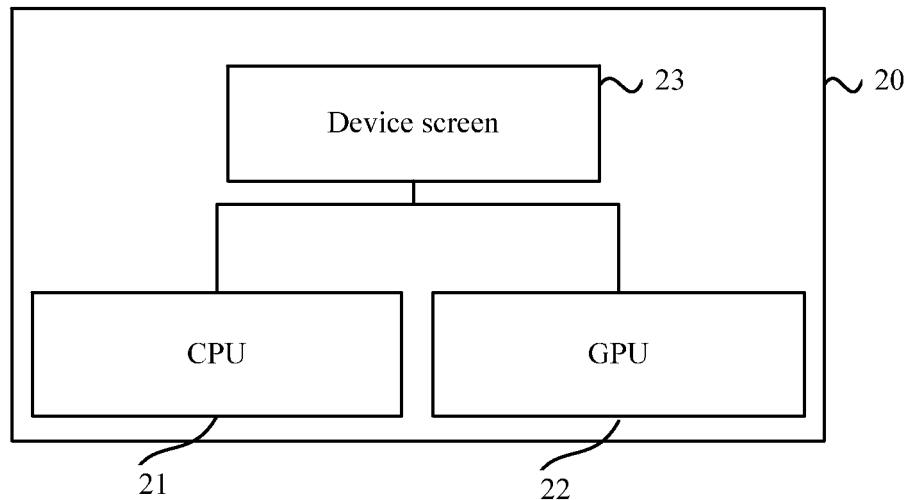
FIG. 5 is a schematic structural diagram of a terminal device according to an embodiment of the present invention.

Referring to FIG. 5, FIG. 5 is a schematic structural diagram of a terminal device 20 provided by an embodiment of the present invention. As shown in FIG. 5, the terminal 20 includes a CPU 21, a GPU 22, and a device screen 23, where the CPU 21 and the GPU 22 are connected to the device screen 23, where the CPU 21 is configured to: receive a drawing command set of a current frame, where the drawing command set includes one or more drawing commands and parameters of the drawing commands; determine a CPU drawing time and a GPU drawing time of the current frame according to the one or more drawing commands and the parameters of the drawing commands in the drawing command set of the current frame; and draw the current frame if the CPU drawing time is less than the GPU drawing time, and if the GPU drawing time is less than the CPU drawing time, the GPU 22 is used to draw the current frame.

Specifically, the CPU 21 is configured to: traverse each of the drawing commands and the parameter of the drawing command in the drawing command set of the current frame; query in a preset performance table according to each of the drawing commands and the parameter of the drawing command to obtain a CPU drawing time and a GPU drawing time corresponding to each of the drawing commands and the parameter of the drawing command; sum up CPU drawing times of all the drawing commands in the drawing command set of the current frame to obtain the CPU drawing time of the current frame; and sum up GPU drawing times of all the drawing commands in the drawing command set of the current frame to obtain the GPU drawing time of the current frame.

The CPU 21 is further configured to, if the CPU drawing time and the GPU drawing time corresponding to the drawing command and the parameter of the drawing command are not found in the preset performance table, calculate the CPU drawing time and the GPU drawing time corresponding to the drawing command and the parameter of the drawing command according to the drawing command and the parameter of the drawing command; and store the calculated CPU drawing time and GPU drawing time, and the drawing command and the parameter of the drawing command in the preset performance table.

The calculation method may be as follows: draw an image object corresponding to the drawing command and the parameter of the drawing command by using the CPU and the GPU respectively according to the drawing command and the parameter of the drawing command; and record, in the process of drawing the image object corresponding to the drawing command and the parameter of the drawing command by using the CPU and the GPU respectively, times used by the CPU and the GPU to draw the image object respectively, where the recorded time used by the CPU to draw the image object corresponding to the drawing command and the parameter of the drawing command is the CPU drawing time corresponding to the drawing command and the parameter of the drawing command, and the recorded time used by the GPU to draw the image object corresponding to the drawing command and the parameter of the drawing command is the GPU drawing time corresponding to the drawing command and the parameter of the drawing command.

The CPU 21 is further configured to, if the CPU is used to draw the current frame, save a CPU drawing result of the current frame in a bitmap, and if the GPU is used to draw the current frame, save a GPU drawing result of the current frame in a texture, and display the drawing result saved in the bitmap or the texture on a screen.

The GPU is configured to draw the current frame, and the device screen 23 is configured to display a drawing result of the current frame drawn by using the CPU 21 or the GPU 22. Specifically, the device screen 23 is configured to display a drawing result saved in the bitmap or the texture.

It can be seen that, in the terminal device provided by this embodiment of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved.

Further, by selecting the Bitmap or Texture saving manner, different rendering channels can be selected for displaying according to different drawing manners. This improves the display performance of the system more effectively.

Figure 6:
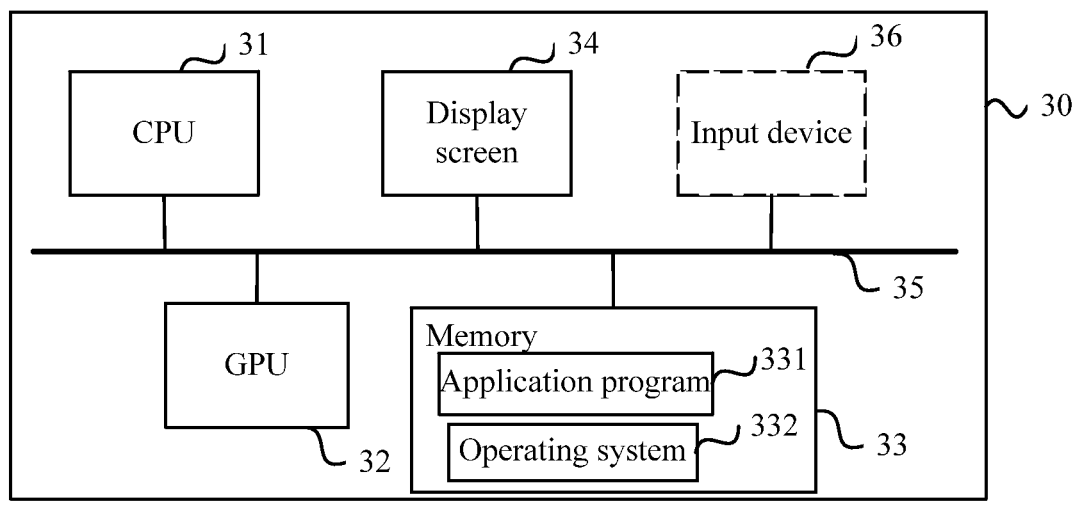
FIG. 6 is a schematic structural diagram of another terminal device according to an embodiment of the present invention.

Referring to FIG. 6, FIG. 6 is a schematic structural diagram of another terminal device 30 provided by an embodiment of the present invention. As shown in FIG. 6, the terminal device 30 includes a CPU 31, GPU 32, a memory 33, a display screen 34, and a bus 35. The CPU 31, the GPU 32, the memory 33, and the display screen 34 are connected by using the bus 35.

The memory 33 may be implemented as one or more of a floppy disk, a universal serial bus (USB) flash drive, a removable hard disk, a read-only memory (ROM), a random access memory (RAM), a magnetic disk, or an optical disc of a computer.

The memory 33 is configured to store the following elements, executable modules, or data structures, or subsets thereof, or a set of extensions thereof an application program 331, including various application programs, for example, Home, Contacts, Browser and the like shown in FIG. 1, which are used to implement various application services. An operating system 332, including various system programs, for example, the display framework, the 2D graphic library engine, the display synthesizing layer and the like, is shown in FIG. 1. The system programs are used to implement various basic services and process hardware-based tasks.

In an embodiment of the present invention, the CPU performs the following operations by calling a program stored in the memory 33 (the program may be stored in the operating system 332): receive a drawing command set of a current frame, where the drawing command set includes one or more drawing commands and parameters of the drawing commands; determine a CPU drawing time and a GPU drawing time of the current frame according to the drawing command set of the current frame; and use the CPU 31 to draw the current frame if the CPU drawing time is less than the GPU drawing time, and use the GPU 32 to draw the current frame if the GPU drawing time is less than the CPU drawing time. The drawing command set of the current frame may come from the operating system 332 itself or may come from the application program 331.

Specifically, the CPU 31 traverses each of the drawing commands and the parameter of the drawing command in the drawing command set of the current frame; queries in a preset performance table according to each of the drawing commands and the parameter of the drawing command to obtain a CPU drawing time and a GPU drawing time corresponding to each of the drawing commands and the parameter of the drawing command; sums up CPU drawing times of all the drawing commands in the drawing command set of the current frame to obtain the CPU drawing time of the current frame; and sums up GPU drawing times of all the drawing commands in the drawing command set of the current frame to obtain the GPU drawing time of the current frame. If a CPU drawing time and a GPU drawing time corresponding to a drawing command and a parameter of the drawing command are not found in the preset performance table, the CPU drawing time and the GPU drawing time corresponding to the drawing command and the parameter of the drawing command are calculated according to the drawing command and the parameter of the drawing command. Specifically, a calculation process is activated; the drawing command and the parameter of the drawing command are passed to the calculation process; and the CPU drawing time and the GPU drawing time corresponding to the drawing command and the parameter of the drawing command are simultaneously calculated by using the calculation process. Then, the calculated CPU drawing time and GPU drawing time, and the drawing command and the parameter of the drawing command are stored in the preset performance table. The specific calculation method may be as follows: draw an image object corresponding to the drawing command and the parameter of the drawing command by using the CPU and the GPU respectively according to the drawing command and the parameter of the drawing command; and record, in the process of drawing the image object corresponding to the drawing command and the parameter of the drawing command by using the CPU and the GPU respectively, times used by the CPU and the GPU to draw the image object respectively, where the recorded time used by the CPU to draw the image object corresponding to the drawing command and the parameter of the drawing command is the CPU drawing time corresponding to the drawing command and the parameter of the drawing command, and the recorded time used by the GPU to draw the image object corresponding to the drawing command and the parameter of the drawing command is the GPU drawing time corresponding to the drawing command and the parameter of the drawing command.

The preset performance table may be stored in the memory 33. Preferably, the preset performance table is stored in a memory that does not cause data loss in a case of a power failure. In some implementation manners, the memory 33 includes an RAM and a magnetic disk, and the preset performance table may be stored on the magnetic disk.

Further, the CPU 31 is further configured to save a CPU drawing result of the current frame in a bitmap if the CPU is used to draw the current frame, and save a GPU drawing result of the current frame in a texture if the GPU is used to draw the current frame; and display the drawing result saved in the bitmap or the texture on a screen.

The GPU 32 is configured to draw a graphic; the CPU 31 is further configured to draw a graphic.

The display screen 34 is configured to output the graphic drawn by using the CPU 31 or the GPU 32. The display screen 34 may also be a touchscreen.

The terminal device provided by the embodiment of the present invention may further include an input device 36, and a user can use the input device 36 to enter a frame drawing command. In some other embodiments, the frame drawing command may also come from the operating system or an application program. The input device 36 may be implemented as a touchscreen, a mouse, a keyboard, or the like.

If the terminal device 20 or the terminal device 30 provided by the embodiments of the present invention is implemented as a mobile phone terminal, the mobile phone terminal may further include a communications interface, a voice input/output device (for example, a microphone/speaker), a sensor, and the like. Application programs in the mobile phone terminal may further include a Global Positioning System (GPS), a video, music, a game, a browser and the like.

In addition, as shown in FIG. 6, the individual modules are connected by using the bus 35, which may be an Industry Standard Architecture (ISA) bus, a Peripheral Component Interconnect (PCI) bus, an Extended Industry Standard Architecture (EISA) bus or the like. The bus may be one or more physical lines. In a case of a plurality of physical lines, the bus may be divided into an address bus, a data bus, a control bus, and the like. In some other implementation manners of the present invention, the individual modules provided by the embodiments of the present invention may also be connected without using a bus, and may directly establish communication connections therebetween according to signal transmission relationships.

It should be noted that, for division of modules of a program stored in the memory 33, reference may be made to the module dividing manner in the foregoing embodiments, or another module dividing manner may also be used.

It can be seen that, in the drawing method, apparatus, and terminal provided by the embodiments of the present invention, a drawing command set of a current frame is received, where the drawing command set includes one or more drawing commands and parameters of the drawing commands; a CPU drawing time and a GPU drawing time of the current frame are determined according to the drawing command set of the current frame; and if the CPU drawing time is less than the GPU drawing time, the CPU is used to draw the current frame, and if the GPU drawing time is less than the CPU drawing time, the GPU is used to draw the current frame. In this way, a drawing manner which requires a shorter drawing time can be dynamically determined according to the drawing time corresponding to the CPU/GPU manner, so as to shorten a drawing time of each frame to some extent, thereby increasing a display speed of a system and improving display performance. During a UI interaction process, user experience can be significantly improved.

Further, by selecting the Bitmap or Texture saving manner, different rendering channels can be selected for displaying according to different drawing manners. This improves the display performance of the system more effectively.

The described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings illustrating the apparatus embodiment provided by the present invention, the connection relationships between the modules indicate that communication connections exist therebetween, which may be implemented as one or more communication buses or signal lines. This can be understood and implemented by a person of ordinary skill in the art without creative efforts.

Based on descriptions of the foregoing embodiments, a person skilled in the art may clearly understand that, the drawing apparatus described in the embodiments of the present invention may be implemented by software plus necessary general hardware and, certainly, may also be implemented by dedicated hardware including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A drawing method, comprising:
   receiving a drawing command set of a current frame, wherein the drawing command set comprises one or more drawing commands and parameters of the drawing commands;
   determining a central processing unit (CPU) drawing time and a graphic processing unit (GPU) drawing time of the current frame according to the one or more drawing commands and the parameters of the drawing commands in the drawing command set of the current frame;
   drawing the current frame using the CPU based on the determination that the CPU drawing time is less than the GPU drawing time; and
   drawing the current frame using the GPU based on the determination that the GPU drawing time is less than the CPU drawing time,
   wherein determining the CPU drawing time and the GPU drawing time of the current frame according to the one or more drawing commands and the parameters of the drawing commands in the drawing command set of the current frame comprises:
      traversing each of the drawing commands and the parameter of the drawing command in the drawing command set of the current frame;
      querying in a preset performance table according to each of the drawing commands and the parameter of the drawing command to obtain a CPU drawing time and a GPU drawing time corresponding to each of the drawing commands and the parameter of the drawing command;

summing up the CPU drawing times of all the drawing commands in the drawing command set of the current frame to obtain the CPU drawing time of the current frame; and summing up the GPU drawing times of all the drawing commands in the drawing command set of the current frame to obtain the GPU drawing time of the current frame, and wherein the method further comprises:

calculating the CPU drawing time and the GPU drawing time corresponding to the drawing command and the parameter of the drawing command according to the drawing command and the parameter of the drawing command when the CPU drawing time and the GPU drawing time corresponding to the drawing command and the parameter of the drawing command are not found in the preset performance table; and storing the calculated CPU drawing time, the calculated GPU drawing time, the drawing command, and the parameter of the drawing command in the preset performance table.

2. The method according to claim 1, wherein calculating the CPU drawing time and the GPU drawing time corresponding to the drawing command and the parameter of the drawing command according to the drawing command and the parameter of the drawing command comprises:

drawing an image object corresponding to the drawing command and the parameter of the drawing command by using the CPU and the GPU respectively according to the drawing command and the parameter of the drawing command; and recording, in the process of drawing the image object corresponding to the drawing command and the parameter of the drawing command by using the CPU and the GPU respectively, times used by the CPU and the GPU to draw the image object respectively, wherein the recorded time used by the CPU to draw the image object corresponding to the drawing command and the parameter of the drawing command is the CPU drawing time corresponding to the drawing command and the parameter of the drawing command, and wherein the recorded time used by the GPU to draw the image object corresponding to the drawing command and the parameter of the drawing command is the GPU drawing time corresponding to the drawing command and the parameter of the drawing command.

3. The method according to claim 1, wherein the method further comprises:

saving a CPU drawing result of the current frame in a bitmap when the CPU is used to draw the current frame;

saving a GPU drawing result of the current frame in a texture when the GPU is used to draw the current frame; and displaying the drawing result saved in the bitmap or the texture on a screen.

4. A terminal device, comprising:
a central processing unit (CPU);
a graphic processing unit (GPU); and
a device screen, wherein the CPU and the GPU are connected to the device screen, and wherein the CPU is configured to:

receive a drawing command set of a current frame, wherein the drawing command set comprises one or more drawing commands and parameters of the drawing commands;

traverse each of the drawing commands and the parameter of the drawing command in the drawing command set of the current frame;

query in a preset performance table according to each of the drawing commands and the parameter of the drawing command to obtain a CPU drawing time and a GPU drawing time corresponding to each of the drawing commands and the parameter of the drawing command;

sum up CPU drawing times of all the drawing commands in the drawing command set of the current frame to obtain the CPU drawing time of the current frame;

sum up GPU drawing times of all the drawing commands in the drawing command set of the current frame to obtain the GPU drawing time of the current frame; and draw the current frame using the CPU when the CPU drawing time is less than the GPU drawing time, wherein the GPU is configured to draw the current frame when the GPU drawing time is less than the CPU drawing time, wherein the device screen is configured to display a drawing result of the current frame drawn by using the CPU or the GPU, and wherein the CPU is further configured to:

calculate the CPU drawing time and the GPU drawing time corresponding to the drawing command and the parameter of the drawing command according to the drawing command and the parameter of the drawing command when, for one of the drawing commands and a parameter of the drawing command in the drawing command set, a CPU drawing time and a GPU drawing time corresponding to the drawing command and the parameter of the drawing command are not found in the preset performance table; and store the calculated CPU drawing time, the calculated GPU drawing time, the drawing command, and the parameter of the drawing command in the preset performance table.

5. The terminal device according to claim 4, wherein the CPU is further configured to save a CPU drawing result of the current frame in a bitmap when the CPU is used to draw the current frame, wherein the GPU is further configured to a GPU drawing result of the current frame in a texture when the GPU is used to draw the current frame, and wherein the device screen is configured to display the drawing result saved in the bitmap or the texture on a screen.

* * * * *